(12) United States Patent
Yamamoto et al.

(10) Patent No.: US 7,115,329 B1
(45) Date of Patent: Oct. 3, 2006

(54) MAGNETIC RECORDING MEDIUM AND MAGNETIC STORAGE DEVICE

(75) Inventors: Tomoo Yamamoto, Hachioji (JP); Ichiro Tamai, Hachioji (JP); Akira Ishikawa, Kokubunji (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

(21) Appl. No.: 09/914,471

(22) PCT Filed: Mar. 31, 1999

(86) PCT No.: PCT/JP99/01679

§ 371 (c)(1),
(2), (4) Date: Aug. 29, 2001

(87) PCT Pub. No.: WO00/60583

PCT Pub. Date: Oct. 12, 2000

(51) Int. Cl.
*G11B 5/66* (2006.01)
*G11B 5/70* (2006.01)

(52) U.S. Cl. .................................. 428/831.2
(58) Field of Classification Search .......... 428/694 TS, 428/900, 611, 667, 831, 831.2, 832.1, 832.2; 360/97.01
See application file for complete search history.

(56) References Cited

U.S. PATENT DOCUMENTS

| | | | | |
|---|---|---|---|---|
| 5,131,995 A | 7/1992 | Suenaga et al. | ....... | 204/192.16 |
| 5,693,426 A | 12/1997 | Lee et al. | ..................... | 428/611 |
| 5,736,262 A * | 4/1998 | Ohkijima et al. | ........... | 428/611 |
| 5,824,427 A | 10/1998 | Kobayashi et al. | | |
| 5,851,628 A | 12/1998 | Ohkubo et al. | | |
| 5,989,728 A * | 11/1999 | Coffey et al. | ............... | 428/611 |
| 6,150,015 A | 11/2000 | Bertero et al. | .............. | 428/332 |
| 6,159,625 A * | 12/2000 | Ueno | ..................... | 428/694 T |
| 6,248,416 B1 * | 6/2001 | Lambeth et al. | ........... | 428/65.3 |
| 6,255,006 B1 | 7/2001 | Ohnami et al. | ........ | 428/694 TS |
| 6,421,195 B1 | 7/2002 | Rubin et al. | ................. | 360/48 |
| 6,558,811 B1 | 5/2003 | Wong | ..................... | 428/694 T |

FOREIGN PATENT DOCUMENTS

JP 06-096431 4/1994

(Continued)

OTHER PUBLICATIONS

IEEE Transactions on Magnetics, vol. 33, No. 5, Sep. 1997, Y. Hosoe et al.: Experimental Study of Thermal Decay in High-density Magnetic Recording Media, pp. 3028-3030.

*Primary Examiner*—Holly Rickman
(74) *Attorney, Agent, or Firm*—Kenyon & Kenyon LLP

(57) ABSTRACT

A magnetic recording medium which comprises a substrate, an orientation control layer formed directly thereon, and a Co alloy magnetic layer formed thereon directly or indirectly with a Cr underlayer or Cr alloy underlayer interposed between them, the orientation control layer having an L10 crystal structure, L21 crystal structure, fcc crystal structure, or B2 (CsCl) crystal structure containing B, owing to this construction, has a high coercive force and a low noise level and is only slightly vulnerable to thermal fluctuation. A magnetic storage device having a magnetic recording medium, a driver to turn said magnetic recording medium in the recording direction, a magnetic head including a recording element and a read-back element, means to move the magnetic head relative to the magnetic recording medium, and a record-read signal processing means to perform waveform processing on input signals to and output signals from the magnetic head, uses this magnetic recording medium and has a magnetoresistive effect read-back element in its magnetic head. This magnetic storage device has a recording density in excess of 3 Gbit/in$^2$.

11 Claims, 14 Drawing Sheets

FOREIGN PATENT DOCUMENTS

| | | |
|---|---|---|
| JP | A 6-96431 | 4/1994 |
| JP | 07-021534 | 1/1995 |
| JP | 09-016937 | 1/1997 |
| JP | A 9-16937 | 1/1997 |
| JP | 09-259418 | 10/1997 |
| JP | A 9-259418 | 10/1997 |
| JP | 10-112017 | 4/1998 |

* cited by examiner

FIG. 8

|  | Hc[kOe] | S* | MEDIA NOISE |
|---|---|---|---|
| EXAMPLE 1 | 3.8 | 0.85 | 1.0 |
| COMPARISON 1 | 3.0 | 0.70 | 2.0 |

FIG. 9

|  | $Co Cr Pt$ (10,0) DIFFRACTION INTENSITY BY XRD (RELATIVE ITENSITY) |
|---|---|
| EXAMPLE 1 | 1.0 |
| COMPARISON 1 | 0.7 |

FIG. 10

|  | Hc[kOe] | S* | MEDIA NOISE |
|---|---|---|---|
| EXAMPLE 2 | 3.8 | 0.85 | 1.0 |
| COMPARISON 2 | 3.0 | 0.70 | 2.0 |

FIG. 11

|  | $C_o C_r P_t$ (10,0) DIFFRACTION INTENSITY BY XRD (RELATIVE ITENSITY) |
|---|---|
| EXAMPLE 2 | 1.0 |
| COMPARISON 2 | 0.7 |

CRYSTAL STRUCTURE···L2$_1$

TARGET ···NiAl$_{25}$Ti$_{25}$ (a=5.87 Å)

- NUMBER OF ATOMS IN UNIT CELL
  - Ni ATOM : 8
  - Al ATOM : 4
  - Ti ATOM : 4
- COMPOSITION IN UNIT CELL
  - Ni:Al:Ti=2:1:1

LATTICE PLANE PARALLEL TO THE SUBSTRATE SURFACE (ORIENTATIONAL PLANE)···(211)

○ Ni ATOM
◉ Al ATOM
● Ti ATOM

IN-PLACE CRYSTAL LATTICE
COMPOSITION IN UNIT CELL ···Ni:Al:Ti=2:1:1

FIG. 13

|  | Hc[kOe] | S* | MEDIA NOISE |
|---|---|---|---|
| EXAMPLE 3 | 3.5 | 0.80 | 1.0 |
| COMPARISON 3 | 3.0 | 0.70 | 1.7 |

FIG. 14

|  | $Co\,Cr\,Pt$ (10,0) DIFFRACTION INTENSITY BY XRD (RELATIVE ITENSITY) |
|---|---|
| EXAMPLE 3 | 1.0 |
| COMPARISON 3 | 0.7 |

FIG. 15

| CRYSTAL STRUCTURE | LATTICE PLANE PARALLEL TO THE SUBSTRATE SURFACE (ORIENTATIONAL PLANE) | IN-PLACE CRYSTAL LATTICE |
|---|---|---|
| f.c.c. STRUCTURE Au a=4.078Å | (110) | 4.078 (a) 2.884 (a√2/2) |

| ELEMENT | a Å | a√2/2 [Å] |
|---|---|---|
| Al | 4.051 | 2.864 |
| Cu | 3.615 | 2.556 |
| Rh | 3.803 | 2.689 |
| Pd | 3.890 | 2.751 |
| Ag | 4.086 | 2.889 |
| Ir | 3.839 | 2.715 |
| Pt | 3.923 | 2.774 |
| At | 4.078 | 2.884 |

FIG. 16

|  | Hc[kOe] | S* | MEDIA NOISE |
|---|---|---|---|
| EXAMPLE 4 | 3.2 | 0.80 | 1.0 |
| COMPARISON 4 | 3.0 | 0.70 | 2.0 |

FIG. 17

|  | $Co Cr Pt$ (10,0) DIFFRACTION INTENSITY BY XRD (RELATIVE ITENSITY) |
|---|---|
| EXAMPLE 4 | 1.0 |
| COMPARISON 4 | 0.8 |

# MAGNETIC RECORDING MEDIUM AND MAGNETIC STORAGE DEVICE

TECHNICAL FIELD

The present invention relates to a magnetic recording medium, such as magnetic disk medium, and a magnetic storage device, such as magnetic disk device, provided with said magnetic recording medium.

BACKGROUND ART

There has been a growing trend in recent years for magnetic disk devices to increase in capacity and recording density. The result is a continuing decrease in the size of recording bits formed on the magnetic recording medium. The currently available magnetic recording medium does not readily realize the ultra-high recording density exceeding 3 Gbit/in$^2$ without further reduction in medium noise. Therefore, it is important to make finer crystals constituting the magnetic film. Unfortunately, resulting fine magnetic crystals have such an extremely small volume that they decrease in recording magnetization by the strong influence of thermal energy even at normal temperature. In actuality, information recorded on a low-noise medium with a density of 115 kFCI is attenuated by more than 10% after 96 hours, as reported by Y. Hosoe et al. (IEEE Trans. Magn., 33, pp. 3028–3030, September 1997)

U.S. Pat. No. 5,693,426 discloses a magnetic recording medium which consists of an orientation control layer having the B2 (CsCl) structure and a magnetic layer formed thereon directly or indirectly with a Cr underlayer interposed between them.

Japanese Patent Laid-open No. 21543/1995 discloses a dual underlayer consisting of a first one of Cr and a second one of CrMo alloy. According to this disclosure, the first Cr underlayer is formed directly on the substrate.

SUMMARY

A magnetic layer of hcp crystal structure formed on an underlayer of bcc crystal structure having (11.0) orientation. As the result, the axis of easy magnetization of the magnetic layer orients in the plane of the layer, and the magnetic layer takes on the crystal structure in which a plurality of magnetic crystal grains grow on a single crystal grain of the underlayer in such a way that the axes of easy magnetization intersect one another at right angles. The magnetic layer of crystal structure makes it difficult to control the grain size of crystals constituting the magnetic layer, and the resulting crystals have such an extremely small particle diameter that they are easily influenced by thermal fluctuation. The result is a decrease with time in read output. The magnetic layer of crystal structure hardly permits Cr to segregate at grain boundaries, which results in a strong mutual interaction between crystal grains constituting the magnetic layer. This in turn leads to a decrease in effective anisotropy energy and coercive force. This phenomenon is conspicuous particularly in the region of the magnetic layer where magnetization is small, and it poses a serious problem if the product of residual magnetic flux and magnetic layer thickness is smaller than 70 G·μm.

The magnetic layer should be free of crystal structure if it is to have good resistance to thermal fluctuation. One way to achieve this objective is by the (211) orientation of the Cr underlayer or the like which adjoins the magnetic layer and has the bcc structure. However, this is not practicable, because the Cr underlayer of bcc structure formed directly on the substrate by sputtering grows keeping the (110) plane (which is a closed packed plane) parallel to the substrate. The (100) orientation (which is a matastable plane) is achieved if the substrate temperature is raised so that particles adhering to the substrate are activated during sputtering. The (211) orientation needs such a higher particle energy that it hardly takes place preferentially.

The process in the above-cited U.S. Pat. No. 5,693,426 employs epitaxial growth to make the Cr underlayer having (211) orientation. To be more specific, the desired orientation is achieved by forming an orientation control layer (such as NiAl having the B2 crystal structure) on the substrate and growing the Cr underlayer thereon by epitaxial growth. The effect of this layer structure is apparent as shown in FIG. 2. It is to be noted that the B2 orientation control layer, the Cr underlayer, and the magnetic layer are almost identical in the lattice spacing of their two-dimensional lattice. This lattice matching is important for the underlayer and the magnetic layer to have (211) orientation and (10.0) orientation, respectively.

As shown in FIG. 2, the B2 crystal structure of the orientation control layer is similar to the bcc structure, but the former differs from the latter in that the atom at the center of the body is different from the atoms at the corners of the cube. When formed by thin-film technology, the orientation control layer of B2 crystal structure varies in orientation depending on particle energy. If particle energy is low, (110) orientation appears, which is most stable as in the case of bcc crystal structure. By contrast, if particle energy is high, the (100) orientation does not take place unlike the bcc crystal structure but the (211) orientation takes place.

A probable reason for this is as follows. For a material of B2 crystal structure having (100) orientation, it is necessary that the first layer be composed of Ni atoms only and the second layer be composed of Al atoms only. This does not happen, however, in such a state that Ni and Al atoms reach the substrate all together. Therefore, the (100) orientation hardly takes place. In the case of the (110) and (211) orientations, the two-dimensional lattice in each plane consists of unit cells (two-dimensional unit cells) in which the ratio of Ni atoms to Al atoms is 1:1. This ratio agrees with the target composition. Therefore, orientation control layer of B2 crystal structure has (110) orientation (the most stable plane) when particle energy is low; on the other hand, orientation control layer with B2 crystal structure has (211) orientaion (the second most stable plane) when particle energy is high.

For reasons mentioned above, the magnetic disk medium disclosed in U.S. Pat. No. 5,693,426 is characterized by the magnetic layer which is composed of crystal grains of uni-crystalline-structure and hence has improved resistance to thermal fluctuation. Unfortunately, the magnetic layer of hcp crystal structure is composed of crystal grains whose c axis (the axis of easy magnetization) does not readily orient longitudinally. This leads to a low coercive force and a low resolution at the time of recording and reading. In addition, the underlayer has a large grain size, which makes the magnetic layer to have a large grain size. The large magnetic grain size increases media noise.

The present invention was completed to address the above-mentioned problems. It is a first object of the present invention to provide a low-noise longitudinal magnetic recording medium superior in resistance to thermal fluctuation. It is a second object of the present invention to provide a magnetic storage device having a recording density exceeding 3 Gbit/in$^2$.

The above-mentioned objects are achieved when the magnetic layer is of uni-crystalline-structure and the magnetic layer is composed of fine crystal grains.

The present invention is directed to a magnetic recording medium which comprises a substrate, an orientation control layer formed thereon, and a Co alloy magnetic layer formed thereon directly or indirectly with a Cr underlayer or Cr alloy underlayer interposed between them, said orientation control layer containing at least Ti in an amount not less than 35 at. % and not more than 65 at. % and Al in an amount not less than 35 at. % and not more than 65 at. %. According to a preferred embodiment, the above-mentioned orientation control layer substantially has the L10-type (AuCu I-type) crystal structure, so that the axis of easy magnetization orients longitudinally in the magnetic layer. The L10-type crystal structure resembles the fcc crystal structure except that the atom at the center of the side face differs from other atoms. Examples of the material having the L10 crystal structure include TiAl, NiZn, AuCu, FePd, and NiMn. TiAl is practicable judging from its phase diagram.

The present invention is directed also to a magnetic recording medium which comprises a substrate, an orientation control layer formed thereon, and a Co alloy magnetic layer formed thereon with a Cr underlayer or Cr alloy underlayer interposed between them, said orientation control layer containing at least one element selected from group A (consisting of Ni and Co) in an amount of from 30 at. % to 60 at. %, Al in an amount from 20 at. % to 30 at. %, and one element selected from group B (consisting of Ti and Zr) in an amount from 20 at. % to 30 at. %. According to a preferred embodiment, the above-mentioned orientation control layer substantially has the L21-type ($Cu_2AlMn$ type) crystal structure, so that the axis of easy magnetization orients longitudinally in the magnetic layer. Like the B2 crystal structure, the L21 crystal structure consists of four cubes each characterized in that the atom at the center of the body differs from the atoms at the corners of the body. But unlike the B2 crystal structure, the L21 crystal structure has two kinds of body center atoms, so that adjoining cubes have different atoms at the body center. Examples of the material having the L21 crystal structure include $Ni_2AlTi$, $Ni_2AlZr$, $Co_2AlTi$, and $Co_2AlZr$.

The present invention is directed also to a magnetic recording medium which comprises a substrate, an orientation control layer formed thereon, and a Co alloy magnetic layer formed thereon with a Cr underlayer or Cr alloy underlayer interposed between them, said orientation control layer containing at least one species of element selected from Al, Cu, Rh, Pd, Ag, Ir, Pt, and Au in an amount not less than 70 at. %. According to a preferred embodiment, the above-mentioned orientation control layer substantially has the fcc crystal structure, so that the axis of easy magnetization orients longitudinally in the magnetic layer.

The present invention is directed also to a magnetic recording medium which comprises a substrate, an orientation control layer formed thereon, and a Co alloy magnetic layer formed thereon with a Cr underlayer or Cr alloy underlayer interposed between them, said orientation control layer having the B2 (CsCl) crystal structure incorporated with at least B. According to a preferred embodiment, the amount of B to be added to the above-mentioned orientation control layer is not less than 0.05 at. % and not more than 15 at. %. The amount of B (not less than 0.05 at. % and not more than 15 at. %) is determined on the basis of the material having the B2-type crystal structure. The thus added B precipitates out at the grain boundary in the orientation control layer, thereby making crystal grains fine.

In the case, where the amount of B is comparatively large, B in the grain boundary exists together with metallic atoms contained in the orientation control layer having the B2 crystal structure. Such a region is amorphous and substantially crystalline grains decrease in particle diameter. So long as the crystalline portion in the orientation control layer retains substantially the B2 crystal structure, the (211) orientation of Cr or Cr alloy takes place as intended. In order that the crystalline portion retains the B2 crystal structure, it is necessary that the amount of B to be added should not exceed 15 at. %. In case of an excess amount, the axis of easy magnetization has a weak tendency toward longitudinal orientation in the magnetic layer. With an amount less than 0.05 at. %, B does not produce the effect of making crystal grains fine. The crystalline portion in the orientation control layer having the B2 (CsCl) structure should be composed of at least one kind of alloy selected from Al—Co, Al—Fe, Al—Ni, Al—Pd, Co—Ga, Co—Fe, Co—Ti, Cu—Pd, Cu—Zn, Ga—Ni, Ga—Rh, and Ru—Si. This is desirable for the (211) orientation to take place in the Cr underlayer or Cr alloy underlayer which is formed on the orientation control layer.

It was confirmed that X-ray diffraction by $\theta$–$2\theta$ scan method detects in the magnetic layer the (10.0) plane parallel to the substrate but does not detect in the magnetic layer the (11.0) plane parallel to the substrate. (There is an instance in which the magnetic layer has a small number of (00.2) and (10.1) planes.) The foregoing suggests that the orientation control layer interposed between the substrate and the underlayer changes not only the plane of preferred orientation in the underlayer but also the fine structure in the magnetic layer.

The above-mentioned magnetic layer should preferably contain Cr in an amount not less than 15 at. % and not more than 25 at. % and Pt in an amount not less than 4 at. % and not more than 25 at. %, so that the recording medium has a high coercive force and a low noise level. The magnetic layer may be incorporated with Ta, Ti, and Nb for further noise reduction. In this case the total amount of these elements should not exceed 8 at. % so that the magnetic layer will not become non-magnetic. Of the components constituting the magnetic layer, Co should account for not less than 62 at. %. Otherwise, the residual magnetic flux density remarkably decreases and the magnetic flux leaking from the recording medium decreases, making it difficult for the magnetic head to read signals.

Epitaxial growth of the magnetic layer of hcp structure on the underlayer of bcc structure causes crystals of different structure to grow forcibly. Therefore, it gives defects or forms fine magnetic crystal grains in the initial stage of crystal growth in the magnetic layer. Such defects and fine crystal grains are readily subject to thermal fluctuation and hence they cause the read output to decrease with time at a faster rate after signal recording. In order to minimize such adverse effects, it is desirable to interpose a non-magnetic interlayer of hcp structure between the underlayer and the magnetic layer. This interlayer absorbs defects and fine particles that occur at the interface with the underlayer of bcc structure and hence it protects the magnetic layer from adverse effects. The non-magnetic interlayer of hcp structure should preferably be formed from a Co-based material containing at least Cr in an amount not less than 25 at. %.

The present invention is directed also to a magnetic storage device having a magnetic recording medium, a driver to turn said magnetic recording medium in the recording direction, a magnetic head consisting of a recording element and a read-back element, a means to move said magnetic head relative to said magnetic recording medium, and a record-read signal processing means to perform waveform processing on input signals to and output signals from said magnetic head, wherein said magnetic recording medium is any one of the magnetic recording media mentioned above and the read-back element of said magnetic head is that of magnetoresistive effect type. The magnetic storage device has a recording density more than 3 Gbit/in$^2$.

BRIEF DESCRIPTION OF THE DRAWINGS

FIG. 8 is a diagram showing the magnetic properties and media noise in Example 1 compared with those in Comparative Example 1.

FIG. 9 is a diagram showing the diffraction intensity of the (10.0) plane of the magnetic layer in Example 1 compared with that in Comparative Example 1.

FIG. 10 is a diagram showing the magnetic properties and media noise in Example 2 compared with those in Comparative Example 2.

FIG. 11 is a diagram showing the diffraction intensity of the (10.0) plane of the magnetic layer in Example 2 compared with that in Comparative Example 2.

FIG. 13 is a diagram showing the magnetic properties and media noise in Example 3 compared with those in Comparative Example 3.

FIG. 14 is a diagram showing the diffraction intensity of the (10.0) plane of the magnetic layer in Example 3 compared with that in Comparative Example 3.

FIG. 15 is a diagram showing the model of the crystal structure of the orientation control layer having the fcc-type crystal structure according to the present invention.

FIG. 16 is a diagram showing the magnetic properties and media noise in Example 4 compared with those in Comparative Example 4.

FIG. 17 is a diagram showing the diffraction intensity of the (10.0) plane of the magnetic layer in Example 4 compared with that in Comparative Example 4.

DETAILED DESCRIPTION

The invention will be described in more detail with reference to the following examples.

EXAMPLE 1

Figure 3:
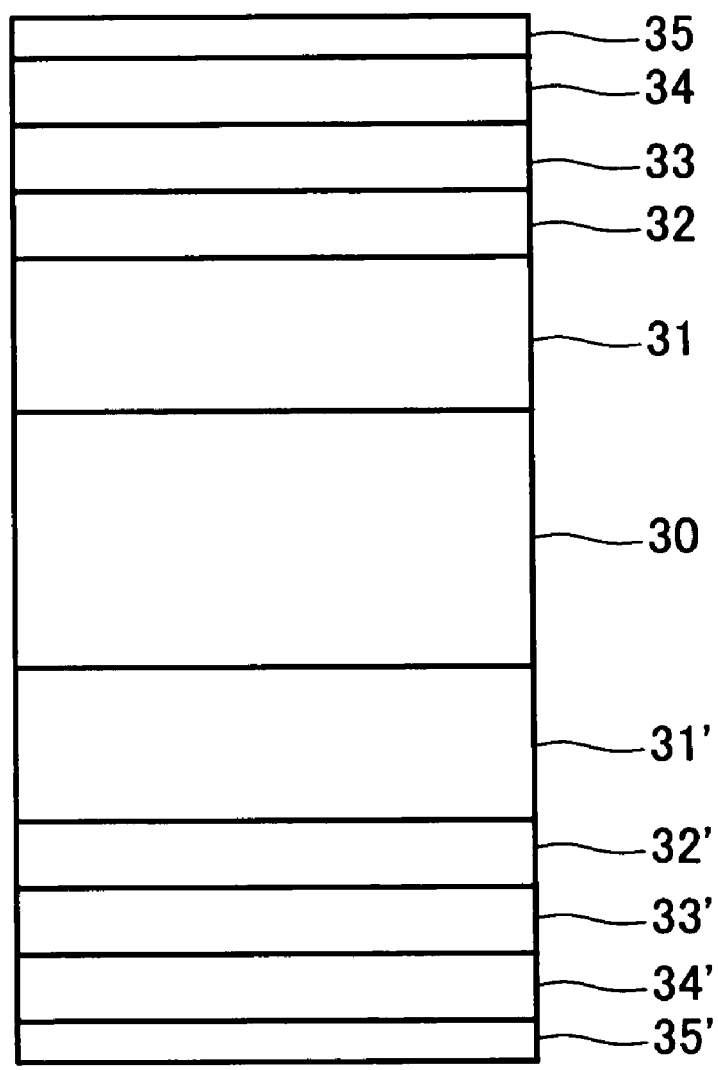
FIG. 3 is a schematic sectional view showing the magnetic recording medium in one example of the present invention.

This example demonstrates a magnetic disk of the present invention which is shown in section in FIG. 3. This magnetic disk was produced in the following manner.

A glass substrate 30 (65 mm in outside diameter) was covered with an orientation control layer 31 (and 31') of Ti-50 at. % Al (100 nm thick) by DC magnetron sputtering under the condition that the substrate temperature is 270° C., the Ar gas pressure is 2.0 mTorr, and the input power density is 0.7 W/cm$^2$. On the orientation control layer were sequentially formed a first underlayer 32 (and 32') of Cr (20 nm thick), a second underlayer 33 (and 33') of Cr-30 at. % Mo (20 nm thick), a magnetic layer 34 (and 34') of Co-20 at. % Cr-12 at. % Pt-1.5 at. % Ti (20 nm thick), and a protective layer 35 (and 35') of C (5 nm thick) under the same condition as mentioned above. The number preceding each element represents the content of the relevant element.

In Comparative Example 1, a magnetic disk was prepared in the same way as in Example 1 except that the orientation control layer 31 (and 31') of Ti-50 at. % Al was replaced by that of Ni-50 at. % Al. The orientation control layer in Example 1 had the L10 crystal structure, whereas that in Comparative Example 1 had the B2 crystal structure.

FIG. 8 shows the in-plane magnetic properties and media noise in Example 1 and Comparative Example 1. The value of media noise is that which was measured for signals recorded at 250 kFCI. The value in Example 1 is unity and the value in Comparative Example 1 is relative to unity. It is noted that the magnetic disk in Example is higher in coercive force ($H_c$) and lower in media noise than that in Comparative Example 1. It is also noted that the magnetic disk in Example 1 is higher in coercivity squareness (S*) than that in Comparative Example 1. This suggests a better resolution.

The CoCrPt magnetic layer was tested for diffraction intensity at the (10.0) plane by X-ray diffraction. The results are shown in FIG. 9. The value in Example 1 is unity and the value in Comparative Example 1 is relative to unity. The larger the value, the more the axis of easy magnetization orients in the plane of the magnetic layer. It is understood that the diffraction intensity is higher and there are more magnetic particles whose axis of easy magnetization orients in the plane in Example 1 than in Comparative Example 1.

The CoCrPt magnetic layer of the magnetic disk in both Example 1 and Comparative Example 1 does not give diffraction due to the (11.0) plane. This suggests that the crystal grains in the magnetic layer has the uni-crystalline-structure.

Incorporation of 10 at. % B into the orientation control layer of the magnetic disk in Example 1 reduced media noise by 10%. A probable reason for this is that B in the orientation control layer segregates in grain boundaries, thereby making crystal grains fine.

Examples of materials having the L10 crystal structure include TiAl, NiZn, AuCu, FePd, and NiMn. Of these examples, TiAl is practical judging from its phase diagram.

Figure 1:
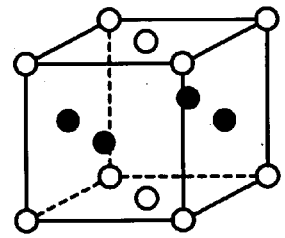
FIG. 1 is a diagram showing the model of the crystal structure of the orientation control layer having the L10-type crystal structure according to the present invention.

In this example, the orientation control layer of L10 structure must cause the Cr underlayer formed thereon to have the (211) orientation. To this end, it is necessary that the (101) and (011) oriented orientation control layer, as shown in FIG. 1. Since the L10 structure is tetragonal, (110) is not equivalent to (101) and (011). The (110) orientation gives the two dimensional lattice structure in which each layer consists of identical atoms or the first layer consists only of Ti atoms and the second layer consists only of Al atoms. Such orientation, however, hardly occurs under the condition that Ti atoms and Al atoms reach the substrate all together. On the other hand, in the case of the (101) or (011) orientation, the ratio of atoms constituting the two dimensional lattice agrees with the ratio of atoms constituting the unit cell and the target composition. Such orientation easily occurs as desired.

The lattice spacing of the two-dimensional lattice resulting from the orientation control layer of L10 structure which has (101) or (011) orientation is almost identical with that resulting from the (211) oriented Cr underlayer and the (10.0) oriented magnetic layer. Therefore, the Cr underlayer epitaxially grows with having (211) orientation and the magnetic layer epitaxially grows with having the (10.0) orientation. For this reason, the crystal grains of the magnetic layer are of uni-crystalline-structure and the recording medium thus obtained has good resistance to thermal fluctuation.

The orientation control layer of L10 crystal structure should preferably contain Ti and Al in an atomic ratio of 1:1. The preferred layer composition is such that the content of Ti is not less than 35 at. % and not more than 65 at. % and the content of Al is not less than 35 at. % and not more than 65 at. %. The orientation control layer of L10 structure which is actually obtained by sputtering has a composition which is slightly different from the target composition. Thus the L10 crystal structure will have some defects and disorders. However, this is not a serious problem.

As mentioned above, the orientation control layer is formed from a material of L10 crystal structure, such as TiAl, NiZn, AuCu, FePd, and NiMn. These materials may be incorporated with any other element in an amount not more than 30 at. %, such that the added element precipitates out in the grain boundaries. This is one way to make fine the crystal grains of L10 structure. Since precipitation of the added element in the grain boundaries forms an amorphous region, the crystal grains of L10 structure do not prevent Cr from the (211) orientation. Incorporation with B is particularly effective, because B easily segregates in the grain boundaries, thereby making fine crystal grains in the orientation control layer. The result is that the magnetic layer formed on the orientation control layer is composed of fine crystal grains, which contributes to noise reduction. The kind of the added element is not specifically restricted so long as the crystal grains in the orientation control layer retain the L10 structure so that the desired effect is produced. In order that the crystal grains retain the L10 structure, it is necessary that the amount of the added element be not more than 30 at. % of the total composition of the orientation control layer.

In this example, the orientation control layer is composed of the crystal gains of L10 structure which contains a large amount of Ti. Ti makes the crystal grains fine. The result is that the magnetic layer formed on the orientation control layer is composed of fine crystal grains and hence the resulting magnetic disk has a low noise level.

In this example, a mention was made of the magnetic disk in which the Cr underlayer is interposed between the magnetic layer and the orientation control layer of L10 structure. However, the construction of the magnetic disk may be modified such that the magnetic layer is formed directly on the orientation control layer of L10 structure. This poses no problem in view of the fact that the two-dimensional lattice of the magnetic layer and the two-dimensional lattice of the orientation control layer of L10 structure have almost the same lattice spacing, as shown in FIG. 1. However, in the case where the Cr underlayer is not formed, the axis of easy magnetization has a slightly weak tendency toward in-plane orientation in the magnetic layer. This leads to a decrease in coercive force and an increase in noise level.

For the magnetic recording medium to have a high coercive force and a low noise level, it is common practice to incorporate the magnetic layer with such an element as Pt, Ta, Ti, and Nb. Incorporation with such an element causes the magnetic layer of hcp structure to have a larger lattice constant and the two-dimension lattice formed by the (10.0) plane of the magnetic layer has a larger lattice spacing. The result is poor lattice matching between the magnetic layer and the orientation control layer of L10 structure and poor lattice matching between the magnetic layer and the Cr underlayer. Therefore, the underlayer should be made of an alloy having a large lattice constant. Such an alloy is exemplified by those of Cr—Ti (5–50 at. %), Cr—Mo (5–100 at. %), and Cr—Mo—Ti. The underlayer made of any of these alloys improves the in plane orientation of the axis of easy orientation of the magnetic layer. It is important that the underlayer have the bcc crystal structure. The Cr—Mo alloy used for the alloy underlayer is a homogeneous solid solution as indicated by its phase diagram for bulk metal and hence it has always the bcc crystal structure. This property makes it easy to produce crystals having any desired lattice spacing. The Cr—Ti alloy gives an underlayer consisting of fine crystal grains and hence the magnetic layer formed thereon also consists of fine crystal grains. This is desirable for noise reduction. However, the Cr—Ti alloy for the underlayer should contain a limited amount of Ti not exceeding 50 at. % because Ti has the hcp crystal structure. The underlayer made of Cr—Mo—Ti alloy has the property derived from respective properties of Cr—Mo alloy and Cr—Ti alloy in proportion to the content of each element. The alloy for the underlayer may contain any of Nb, Ta, and W in place of Cr, Mo, and Ti (although the resulting alloy is slightly inferior to the alloy containing Cr, Mo, and Ti). Other elements than mentioned above should not be used because they disturb crystal orientation and give rise to large crystal grains, which leads to a decrease in coercive force and an increase in noise.

According to a preferred embodiment, the underlayer is of double-layer structure, with the first layer containing Cr and the second layer which is formed on the first underlayer containing at least one element selected from Cr, Nb, Mo, Ta, W, and Ti. This underlayer is desirable because it permits the axis of easy magnetization to assume in-plane orientation in the magnetic layer. The results of the present inventors' experiments indicate the following. If the Cr alloy underlayer is formed directly on the orientation control layer of L10 structure, lattice matching between them is poor and hence the crystal orientation in the underlayer as well as the magnetic layer is poor, because the two-dimensional lattice of the former has a much larger lattice spacing than that of the latter. This problem was solved by replacing the underlayer with that of double-layer structure which consists of a first layer of Cr (adjacent to the orientation control layer of L10 structure) and a second layer which has a larger lattice constant than Cr.

Figure 4:
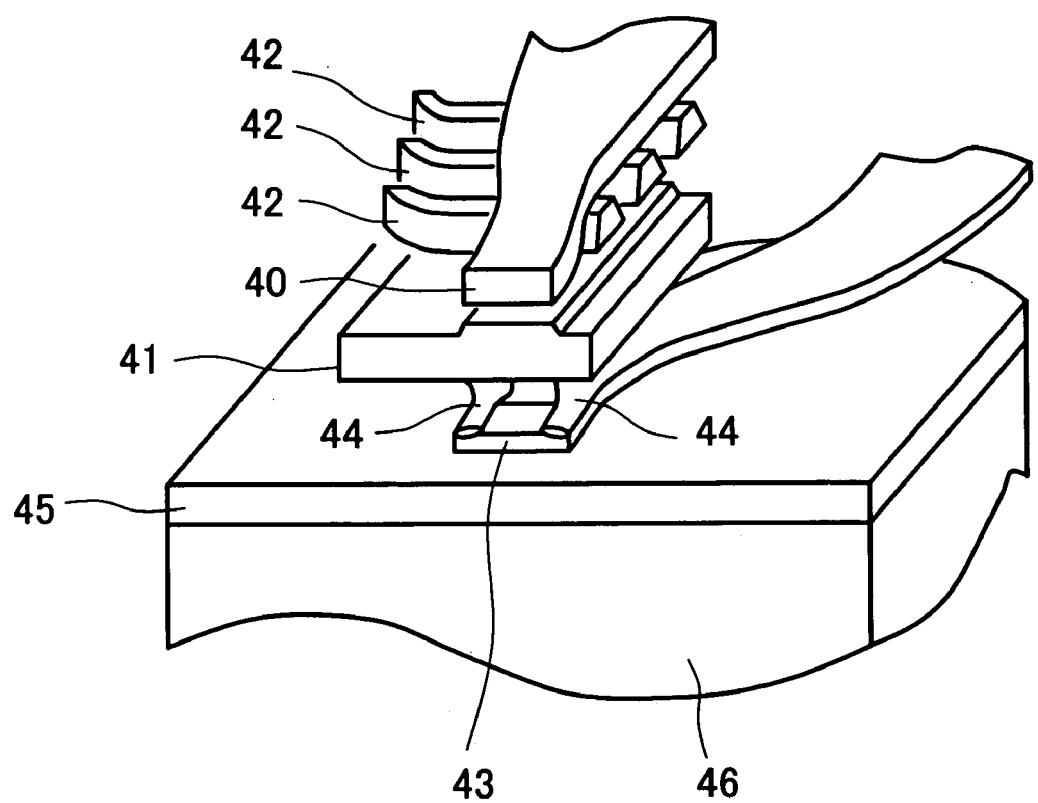
FIG. 4 is a schematic diagram showing the structure of the magnetic head provided with an element that utilizes the magnetoresistive effect.

The magnetic recording medium in Example 1 exhibits its full performance when it works together with a magnetic head provided with a sensor (for read only) that utilizes the magnetoresistive effect. An example of the magnetic head is shown in FIG. 4.

The magnetic head consists of a write head and a read head. The write head is that of thin-film induction type consisting of a pair of recording magnetic poles 40 and 41 and a coil 42. The read head is a magnetoresistive head consisting of a magnetic pole 41 (which functions also as a magnetic shield for the read head), a magnetic shield layer 45 facing the magnetic pole 41, a magnetoresistive sensor 43, and a conductor layer 44 (which functions as an electrode). There is a 0.3-μm gap layer between the recording magnetic poles. Both the magnetic pole 41 and the magnetic shield 45 are 1 μm thick, and the gap between them is 0.25 μm. The magnetic head is mounted on the magnetic head slider base 46. Incidentally, there are not shown in FIG. 4 the gap layer between the shield layer and the magnetoresistive sensor and the gap layer between the recording magnetic poles.

Figure 5:
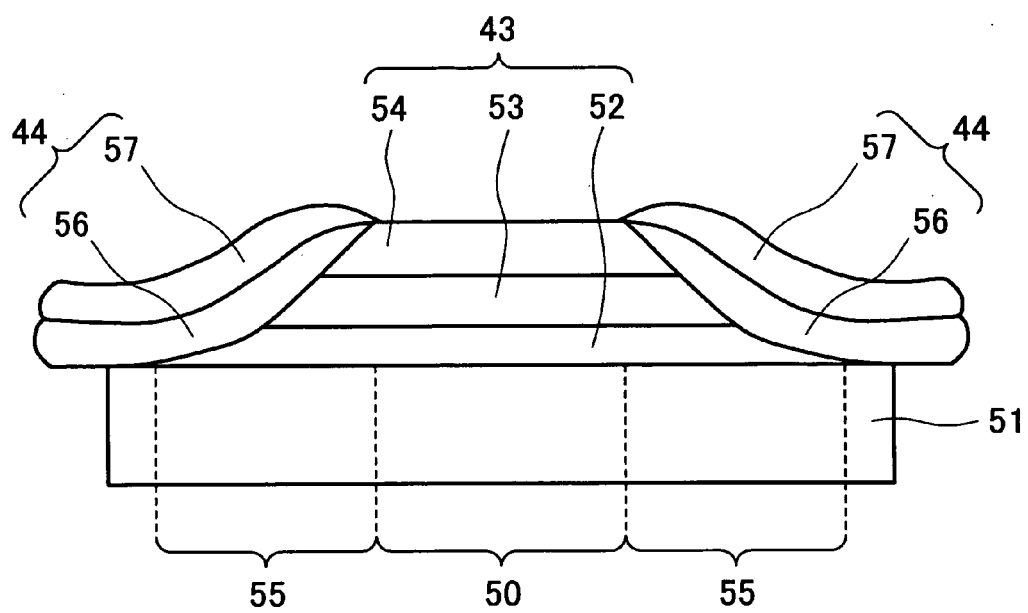
FIG. 5 is a diagram showing the structure of the magnetoresistive sensor.
Figure 6:
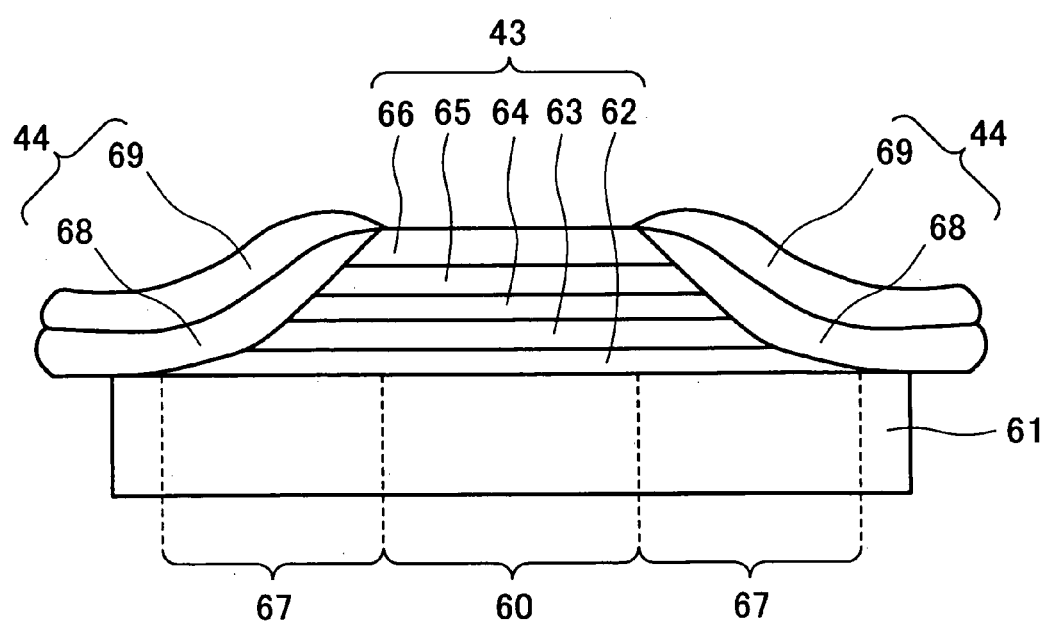
FIG. 6 is a diagram showing the structure of the magnetoresistive sensor of spin valve type.

FIG. 5 is an enlarged sectional view showing the structure of the magnetoresistive sensor 43 in detail. There is shown a signal sensing region 50, which has sloped parts 55. The magnetoresistive sensor 43 consists of a gap layer of aluminum oxide, a transverse bias layer 52, a separating layer 53, and a magnetoresistive ferromagnetic layer 54, which are sequentially formed on top of the other. The magnetoresistive ferromagnetic layer 54 is an NiFe alloy (20 nm thick). The NiFe alloy may be replaced with a ferromagnetic alloy, such as NiFeRh, which has a comparatively high electrical resistance and good soft magnetic properties. The transverse bias layer 52 is magnetized by the magnetic field produced by the sense current flowing through the magnetoresistive ferromagnetic layer 54. Magnetization takes place in the in-plane direction (longitudinal direction) perpendicular to the sense current. Thus the transverse bias layer 52 applies a bias magnetic field to the magnetoresistive ferromagnetic layer 54 in the transverse direction. In this way the magnetoresistive sensor produces a read output which is linear for the leakage flux from the magnetic disk. The separating layer 53 prevents the sense current from the magnetoresistive ferromagnetic layer 54 from shunting. It is made of Ta having a comparatively high electrical resistance, and it is 5 nm thick. The sloped part 55 of the magnetoresistive sensor 43 is covered with a permanent magnet layer 56 and an electrode 57. The former makes the magnetoresistive ferromagnetic layer 54 a single domain, and the latter leads out signals. The permanent magnetic layer 56 should have a high coercive force and invariably keep its direction of magnetization. It is made of CoCr alloy or CoCrPt alloy. For a larger output, the magnetoresistive sensor 43 should preferably be that of spin valve type as shown in FIG. 6. It consists of a signal sensing region 60 and sloped parts 67, which are of laminate structure. The laminate consists of a gap layer 61 of aluminum oxide, a Ta buffer layer 62 (5 nm thick), a first magnetic layer 63 (7 nm thick), a Cu intermediate layer 64 (1.5 nm thick), a second magnetic layer 65 (3 nm thick), and an antiferromagnetic layer 66 of Fe-50 at. % Mn alloy (10 nm thick), which are formed on top of the other. The first magnetic layer 63 is made of Ni-20 at. % Fe alloy and the second magnetic layer 65 is made of Co. The second magnetic layer 65 is magnetized in one fixed direction by the exchange field from the antiferromagnetic alloy layer 66. By contrast, the first magnetic layer 63 (which is in contact with the second magnetic layer 65 with a nonmagnetic interlayer 64 interposed between them) varies in the direction of magnetization depending on the leakage field from the magnetic recording medium. As the two magnetic layers magnetize in different directions, the three layers (the first magnetic layer 63, the intermediate layer 64, and the second magnetic layer 65) as a whole changes in resistance. This phenomenon is called spin valve effect. Incidentally, as in the ordinary magnetoresistive sensor shown in FIG. 5, a permanent magnet layer 68 and an electrode 69 to lead out signals are formed on the sloped part 67. The magnetic head in this example is that of spin valve type which has the magnetoresistive sensor 43 utilizing the spin valve effect as shown in FIG. 6.

Figure 7A:
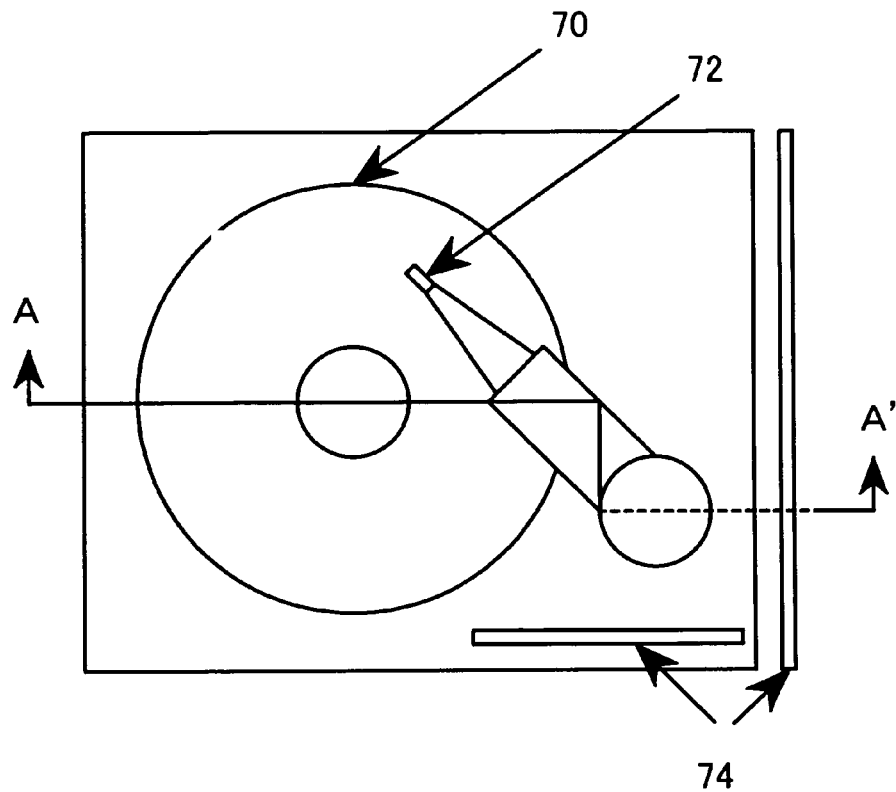
FIG. 7 is a schematic diagram showing the magnetic storage device.
Figure 7B:
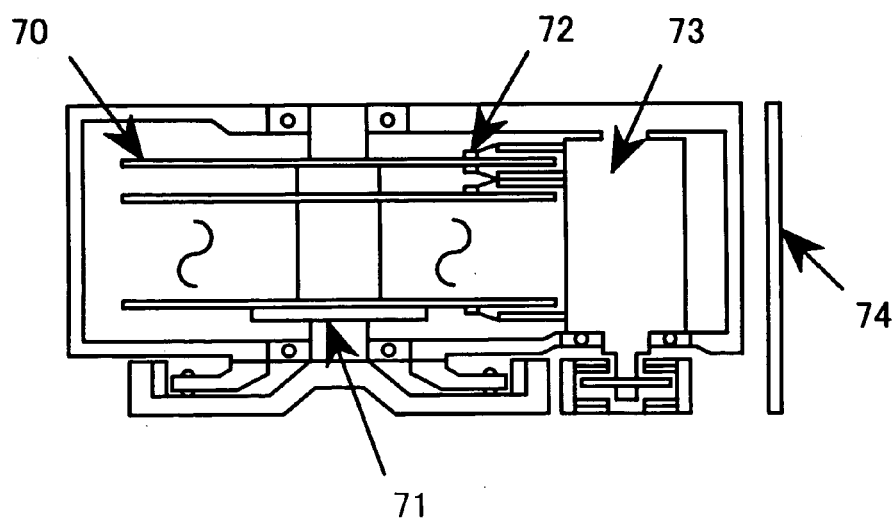

FIG. 7 shows a magnetic storage device consisting of the magnetic disk and magnetic head demonstrated in this example. FIG. 7(a) is a top view and FIG. 7(b) is a schematic sectional view taken in the direction of the arrows along the line A–A'.

There is shown a magnetic disk 70, which is a longitudinal magnetic recording medium. A plurality of magnetic disks are supported on a shaft connected to a disk driver 71. Each face of the magnetic disk is swept by the magnetic head 72 which is shown in FIG. 4. The magnetic head 72 is moved to a desired track by the magnetic head driver 73 in such a way that the flying height is not more than 0.05 μm and the head positioning accuracy is not more than 0.5 μm. The magnetic head 72 reproduces signals, which subsequently undergo waveform processing by the reproduced signal processing unit 74. The reproduced signal processing unit 74 consists of an amplifier, analog equalizer, AD converter, digital equalizer, and maximum likelihood decoder. The analog equalizer fixes and restores the reproduced waveforms. (In reproduction by the magnetic head that utilizes the magnetoresistive effect, reproduced waveforms may be asymmetrical for positive and negative values on account of the characteristic properties of the magnetic head or different from those of recorded signals on account of the further quency characteristics of the write-read system. Such waveforms lead to erratic signal reading.) The restored waveforms are further fixed by the AD converter for digital conversion and the digital equalizer. The signals restored in this manner are finally decoded by the maximum likelihood decoder. The reproduced signal processing unit constructed as mentioned above writes and reads signals at an extremely low error rate. Incidentally, the equalizer and maximum likelihood decoder may be any existing ones.

Owing to the above-mentioned construction, the magnetic storage device in this example has a recording density exceeding 3 Gbit/in$^2$. The recording density is three times higher than that of the conventional magnetic storage device. The magnetic storage device keeps more than twice the recording density of the conventional magnetic storage device even when the maximum likelihood decoder in the recording-reproducing signal processing unit is replaced with an existing waveform discriminator.

What is mentioned above in this example is about the magnetic disk medium and the magnetic storage device provided with it. Needless to say, the present invention can be applied to magnetic recording media in any form (such as tape and card having a magnetic layer on one side) and a magnetic storage device provided with such a magnetic recording medium.

No specific restrictions are imposed on the method of producing the magnetic disk media. The above-mentioned DC magnetron sputtering may be replaced with any of ECR sputtering, ion beam sputtering, vacuum deposition, plasma CVD, coating, plating, etc.

EXAMPLE 2

This example demonstrates another magnetic disk whose construction and manufacturing process are explained in the following.

As in Example 1 shown in FIG. 3, a glass substrate 30 (65 mm in outside diameter) was covered with an orientation control layer 31 (and 31') of Ni-25 at. % Al-25 at. % Ti (100 nm thick) by DC magnetron sputtering under the condition that the substrate temperature is 270° C., the Ar gas pressure is 2.0 mTorr, and the input power density is 0.7 W/cm². On the orientation control layer were sequentially formed a first underlayer 32 (and 32') of Cr (20 nm thick), a second underlayer 33 (and 33') of Cr-30 at. % Mo (20 nm thick), a magnetic layer 34 (and 34') of Co-20 at. % Cr-12 at. % Pt-1.5 at. % Ti (20 nm thick), and a protective layer 35 (and 35') of C (5 nm thick) under the same condition as mentioned above. The number preceding each element represents the content of the relevant element.

In Comparative Example 2, a magnetic disk was prepared in the same way as in Example 2 except that the orientation control layer 31 (and 31') of Ni-25 at. % Al-25 at. % Ti was replaced by that of Ni-50 at. % Al. The orientation control layer in Example 2 had the L21 crystal structure, whereas that in Comparative Example 2 had the B2 crystal structure.

FIG. 10 shows the in-plane magnetic properties and media noise in Example 2 and Comparative Example 2. The value of media noise is that which was measured for signals recorded at 250 kFCI. The value in Example 2 is unity and the value in Comparative Example 2 is relative to unity. It is noted that the magnetic disk in Example 2 is higher in coercive force ($H_c$) and lower in media noise than that in Comparative Example 2. It is also noted that the magnetic disk in Example 2 is higher in coercivity squareness (S*) than that in Comparative Example 2. This suggests a better resolution.

The CoCrPt magnetic layer was tested for diffraction intensity at the (10.0) plane by X-ray diffraction. The results are shown in FIG. 11. The value in Example 2 is unity and the value in Comparative Example 2 is relative to unity. The larger the value, the more the axis of easy magnetization orients in the plane of the magnetic layer. It is understood that the diffraction intensity is higher and there are more magnetic particles whose axis of easy magnetization orients in the plane in Example 2 than in Comparative Example 2.

The CoCrPt magnetic layer of the magnetic disk in both Example 2 and Comparative Example 2 does not give diffraction due to the (11.0) plane. This suggests that the crystal grains in the magnetic layer has the uni-crystalline-structure.

Experiments with the orientation control layer 31 (and 31') in which the alloy was replaced with Ni-25 at. % Al-25 at. % Zr, Co-25% Al-25 at. % Ti, or Co-25 at. % Al-25 at. % Zr gave better results than in Comparative Example 2. It was found that the magnetic recording medium in which the orientation control layer contains Ti and has the L21 structure is about 10% lower in media noise than that in which the orientation control layer contains Zr and has the L21 structure. By contrast, it was also found that the magnetic recording medium in which the orientation control layer contains Zr and has the L21 structure has 10–20% higher coercive force. In addition, incorporation of 10 at. % B into the orientation control layer of the magnetic disk in Example 2 reduced media noise by 10%. A probable reason for this is that B in the orientation control layer segregates in grain boundaries, thereby making crystal grains fine.

Like the B2 crystal structure, the L21 crystal structure consists of four cubes each characterized in that the atom at the center of the body differs from the atoms at the corners of the body. But unlike the B2 crystal structure, the L21 crystal structure has two kinds of body center atoms, so that adjoining cubes have different atoms at the body center. Examples of the material having the L21 crystal structure include $Ni_2AlTi$, $Ni_2AlZr$, $Co_2AlTi$, and $Co_2AlZr$. The subscript number following the element symbol denotes the ratio of atoms contained in the unit cell. For example, $Ni_2AlTi$ indicates that the unit cell consists of eight atoms of Ni and four atoms each of Al and Ti. Thus the ratio of atoms is Ni:Al:Ti=2:1:1.

Figure 12:
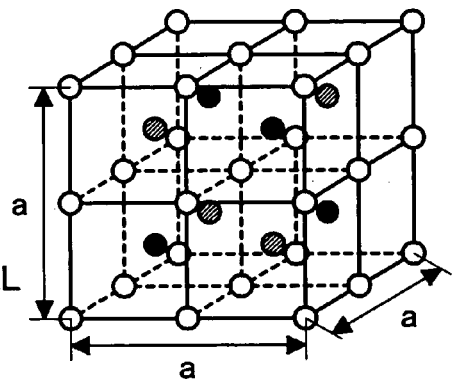
FIG. 12 is a diagram showing the model of the crystal structure of the orientation control layer having the L21-type crystal structure according to the present invention.
Figure 12:
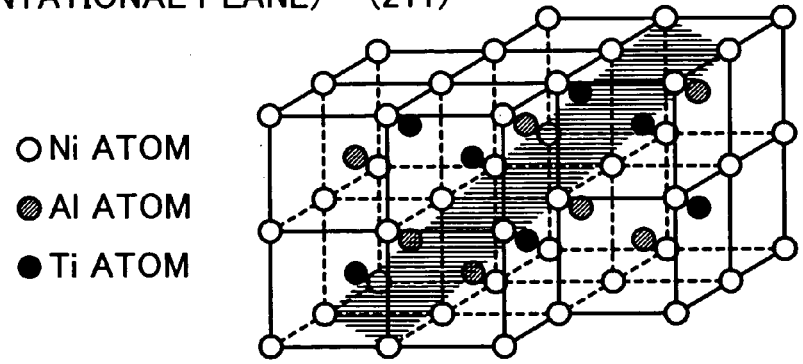
Figure 12:
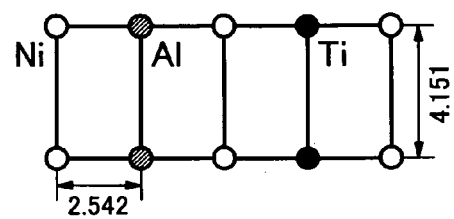

In this example, the orientation control layer of L21 structure must cause the Cr underlayer formed thereon to have the (211) orientation. To this end, it is necessary that the (211) oriented orientation control layer like the orientation control layer of B2 structure. As shown in FIG. 1, when the orientation control layer of L21 structure has the (211) orientation, the ratio of atoms constituting the two-dimensional lattice agrees with that of the target composition and that of the unit cell. Thus, the (211) orientation readily takes place as in the case of the orientation control layer of B2 structure. When the orientation control layer of L21 structure has the (211) orientation, the lattice spacing of the two-dimensional lattice is almost equal to that of the Cr underlayer (which has the (211) orientation as shown in FIG. 12) and the magnetic layer which has the (10.0) orientation. Therefore, the Cr underlayer epitaxially grows with having the (211) orientation and the magnetic layer epitaxially grows with having the (10.0) orientation. The resulting magnetic layer consists of crystal grains of uni-crystalline-structure, and this makes the magnetic recording medium to have good resistance to thermal fluctuation.

The orientation control layer of L21 crystal structure should preferably contain Ni or Co, Al, and Ti or Zr in an atomic ratio of 2:1:1. The preferred layer composition is such that the content of Ni or Co is 30 to 60 at. %, the content of Al is 20 to 30 at. %, and the content of Ti or Zr is 20 to 30 at. %. The orientation control layer actually obtained by sputtering has a composition which is slightly different from the target composition. Thus the L21 crystal structure will have some defects and disorders. However, this is not a serious problem.

The material having the L21 crystal structure may be incorporated with any other element in an amount not more than 30 at. %, such that the added element precipitates out in the grain boundaries. This is one way to make fine the crystal grains. Since precipitation of the added element in the grain boundaries forms an amorphous region, the crystal grains do not prevent Cr from the (211) orientation. The kind of the added element is not specifically restricted so long as the crystal grains in the orientation control layer retain the L21 structure so that the desired effect is produced. In order that the crystal grains retain the L21 structure, it is necessary that the amount of the added element be not more than 30 at. % of the total composition of the orientation control layer. Incorporation with B is particularly effective in noise reduction, because B easily segregates in the grain boundaries, thereby making fine crystal grains in the orientation control layer. The above-mentioned material of L21 structure for the orientation control layer contains either Ti or Zr. Ti or Zr makes the crystal grains fine, which leads to the recording medium having a low noise level. Ti is particularly effective in grain refinement and noise reduction. By contrast, Zr is also effective in grain refinement and noise reduction but is particularly effective in the (211) orientation of Cr and in increasing the read output.

In this example, a mention was made of the magnetic disk in which the Cr underlayer is interposed between the magnetic layer and the orientation control layer of L21 structure. However, the construction of the magnetic disk may be modified such that the magnetic layer is formed directly on the orientation control layer of L21 structure. This poses no problem in view of the fact that the two-dimensional lattice of the magnetic layer and the two-dimensional lattice of the orientation control layer of L21 structure have almost the same lattice spacing, as shown in FIG. 12. However, in the case where the Cr underlayer is not formed, the axis of easy magnetization has a slightly weak tendency toward in-plane orientation in the magnetic layer. This leads to a decrease in coercive force and an increase in noise level.

Figure 2:
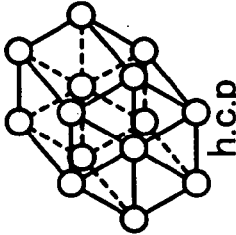
FIG. 2 is a diagram showing the epitaxial relation in the magnetic recording medium having the orientation control layer of B2-type crystal structure.

For the magnetic recording medium to have a high coercive force and a low noise level, it is common practice to incorporate the magnetic layer with such an element as Pt, Ta, Ti, and Nb. Incorporation with such an element causes the magnetic layer of hcp structure to have a larger lattice constant and the two-dimension lattice formed by the (10.0) plane of the magnetic layer has a larger lattice spacing. (The lattice constant of Co is shown in FIG. 2.) The result is poor lattice matching between the magnetic layer and the orientation control layer of L21 structure and poor lattice matching between the magnetic layer and the Cr underlayer. Therefore, the underlayer should be made of an alloy having a large lattice constant. Such an alloy is exemplified by those of Cr—Ti (5–50 at. %), Cr—Mo (5–100 at. %), and Cr—Mo—Ti. The underlayer made of any of these alloys improves the in-plane orientation of the axis of easy orientation of the magnetic layer. It is important that the underlayer have the bcc crystal structure. The Cr—Mo alloy used for the alloy underlayer is a homogeneous solid solution as indicated by its phase diagram for bulk metal and hence it has always the bcc crystal structure. This property makes it easy to produce crystals having any desired lattice spacing. The Cr—Ti alloy gives an underlayer consisting of fine crystal grains and hence the magnetic layer formed thereon also consists of fine crystal grains. This is desirable for noise reduction. However, the Cr—Ti alloy for the underlayer should contain a limited amount of Ti not exceeding 50 at. % because Ti has the hcp crystal structure. The underlayer made of Cr—Mo—Ti alloy has the property derived from respective properties of Cr—Mo alloy and Cr—Ti alloy in proportion to the content of each element. The alloy for the underlayer may contain any of Nb, Ta, and W in place of Cr, Mo, and Ti (although the resulting alloy is slightly inferior to the alloy containing Cr, Mo, and Ti). Other elements than mentioned above should not be used because they disturb crystal orientation and give rise to large crystal grains, which leads to a decrease in coercive force and an increase in noise.

According to a preferred embodiment, the underlayer is of double-layer structure, with the first layer containing Cr and the second layer which is formed on the first underlayer containing at least one element selected from Cr, Nb, Mo, Ta, W, and Ti. This underlayer is desirable because it permits the axis of easy magnetization to assume in-plane orientation in the magnetic layer. The results of the present inventors' experiments indicate the following. If the Cr alloy underlayer is formed directly on the orientation control layer of L21 structure, lattice matching between them is poor and hence the crystal orientation in the underlayer as well as the magnetic layer is poor, because the two-dimensional lattice of the former has a much larger lattice spacing than that of the latter. This problem was solved by replacing the underlayer with that of double-layer structure which consists of a first layer of Cr (adjacent to the orientation control layer of L21 structure) and a second layer which has a larger lattice constant than Cr.

The magnetic disk in this example is combined with the magnetic head shown in FIG. 6 to form the magnetic storage device as shown in FIG. 7. The magnetic head is that of spin valve type provided with a magnetoresistive sensor which utilizes the spin valve effect. Owing to the above-mentioned construction, the magnetic storage device in this example has a recording density exceeding 3 Gbit/in². The recording density is three times higher than that of the conventional magnetic storage device. The magnetic storage device keeps more than twice the recording density of the conventional magnetic storage device even when the maximum likelihood decoder in the recording-reproducing signal processing unit is replaced with an existing waveform discriminator.

EXAMPLE 3

This example demonstrates another magnetic disk whose construction and manufacturing process are explained in the following.

As in Example 1 shown in FIG. 3, a glass substrate 30 (65 mm in outside diameter) was covered with an orientation control layer 31 (and 31') of Au (100 nm thick) by DC magnetron sputtering under the condition that the substrate temperature is 270° C., the Ar gas pressure is 2.0 mTorr, and the input power density is 0.7 W/cm². On the orientation control layer were sequentially formed a first underlayer 32 (and 32') of Cr (20 nm thick), a second underlayer 33 (and 33') of Cr-30 at. % Mo (20 nm thick), a magnetic layer 34 (and 34') of Co-20 at. % Cr-12 at. % Pt-1.5 at. % Ti (20 nm thick), and a protective layer 35 (and 35') of C (5 nm thick) under the same condition as mentioned above. The number preceding each element represents the content of the relevant element.

In Comparative Example 3, a magnetic disk was prepared in the same way as in Example 3 except that the orientation control layer 31 (and 31') of Au was replaced by that of Ni-50 at. % Al. The orientation control layer in Example 3 had the fcc crystal structure, whereas that in Comparative Example 3 had the B2 crystal structure.

FIG. 13 shows the in-plane magnetic properties and media noise in Example 3 and Comparative Example 3. The value of media noise is that which was measured for signals recorded at 250 kFCI. The value in Example 3 is unity and the value in Comparative Example 3 is relative to unity. It is noted that the magnetic disk in Example 3 is higher in coercive force ($H_c$) and lower in media noise than that in Comparative Example 3. It is also noted that the magnetic disk in Example 3 is higher in coercivity squareness (S*) than that in Comparative Example 3. This suggests a better resolution.

The CoCrPt magnetic layer was tested for diffraction intensity at the (10.0) plane by X-ray diffraction. The results are shown in FIG. 14. The value in Example 3 is unity and the value in Comparative Example 3 is relative to unity. The larger the value, the more the axis of easy magnetization orients in the plane of the magnetic layer. It is understood that the diffraction intensity is higher and there are more magnetic particles whose axis of easy magnetization orients in the plane in Example 3 than in Comparative Example 3.

The CoCrPt magnetic layer of the magnetic disk in both Example 3 and Comparative Example 3 does not give diffraction due to the (11.0) plane. This suggests that the crystal grains in the magnetic layer has the uni-crystalline-structure.

Experiments with the orientation control layer in which Au was replaced with Al, Cu, Rh, Pd, Ag, Ir, or Pt, or an alloy thereof gave the same result as mentioned above.

In this example, the orientation control layer must cause the Cr underlayer formed thereon to have (211) orientation. To this end, it is necessary that the (110) oriented orientation control layer as shown in FIG. 15. When the orientation control layer has (110) orientation, the lattice spacing in the two-dimensional lattice approximately agrees with that of the (211) oriented Cr underlayer. Thus, the Cr underlayer epitaxially grows in the (211) orientation and the magnetic layer also epitaxially grows in the (10.0) orientation. The resulting magnetic layer is composed of crystal grains of uni-crystalline-structure and hence the magnetic recording medium has good resistance to thermal fluctuation.

The orientation control layer should have a composition which contains at least one element selected from Al, Cu, Rh, Pd, Ag, Ir, Pt, and Au in an amount not less than 70 at. %. All of these elements have the fcc structure in the form of simple substance. Their alloys usually form homogeneous solid solution, but they still substantially have the fcc structure. For reference, Table 15 shows the size of the two-dimensional lattice in the longitudinal direction (a) and the lateral direction ($\sqrt{2}a/2$), where a denotes the length of the side of the cube. It is noted that all the elements have the value close to the lattice spacing of the two dimensional lattice of the underlayer. In the case where any other element than listed above is added, its content should be not more than 30 at. % so that it does not disturb the crystal structure. Such an additional element improves the lattice matching with the Cr underlayer or Cr alloy underlayer or makes fine the crystal grains. According to the present invention, the underlayer has (211) orientation by epitaxial growth thanks to the fact that both the (110) plane of the orientation control layer and the Cr underlayer or Cr alloy underlayer formed thereon have the two-dimensional lattice with an almost equal lattice spacing. Therefore, so long as the orientation control layer substantially has the fcc structure, the effect of the present invention is produced, and hence it is permissible to add any other element (in an amount not more tan 30 at. %) than Al, Cu, Rh, Pd, Ag, Ir, Pt, and Au.

The foregoing description illustrates the case in which the Cr underlayer or Cr alloy underlayer is interposed between the orientation control layer of fcc structure and the magnetic layer. However, it is also possible to form the magnetic layer directly on the orientation control layer of fcc structure because both the orientation control layer and the (10.0) plane of the magnetic layer have the two-dimensional lattice with an almost equal lattice spacing, as shown in FIG. 15. However, this construction would result in a decrease in coercive force and an increase in media noise as compared with the construction with the Cr underlayer, because the axis of easy magnetization in the magnetic layer has a slightly weak tendency toward in-plane orientation.

For the magnetic recording medium to have a high coercive force and a low noise level, it is common practice to incorporate the magnetic layer with such an element as Pt, Ta, Ti, and Nb. Incorporation with such an element causes the magnetic layer of hcp structure to have a larger lattice constant and the two-dimension lattice formed by the (10.0) plane of the magnetic layer has a larger lattice spacing. (The lattice constant of Co is shown in FIG. 2.) The result is poor lattice matching between the magnetic layer and the orientation control layer of fcc structure and poor lattice matching between the magnetic layer and the Cr underlayer. Therefore, the underlayer should be made of an alloy having a large lattice constant. Such an alloy is exemplified by those of Cr—Ti (5–50 at. %), Cr—Mo (5–100 at. %), and Cr—Mo—Ti. The underlayer made of any of these alloys improves the in-plane orientation of the axis of easy orientation of the magnetic layer. It is important that the underlayer have the bcc crystal structure. The Cr—Mo alloy used for the alloy underlayer is a homogeneous solid solution as indicated by its phase diagram for bulk metal and hence it has always the bcc crystal structure. This property makes it easy to produce crystals having any desired lattice spacing. The Cr—Ti alloy gives an underlayer consisting of fine crystal grains and hence the magnetic layer formed thereon also consists of fine crystal grains. This is desirable for noise reduction. However, the Cr—Ti alloy for the underlayer should contain a limited amount of Ti not exceeding 50 at. % because Ti has the hcp crystal structure. The underlayer made of Cr—Mo—Ti alloy has the property derived from respective properties of Cr—Mo alloy and Cr—Ti alloy in proportion to the content of each element. The alloy for the underlayer may contain any of Nb, Ta, and W in place of Cr, Mo, and Ti (although the resulting alloy is slightly inferior to the alloy containing Cr, Mo, and Ti). Other elements than mentioned above should not be used because they disturb crystal orientation and give rise to large crystal grains, which leads to a decrease in coercive force and an increase in noise.

According to a preferred embodiment, the underlayer is of double-layer structure, with the first layer containing Cr and the second layer which is formed on the first underlayer containing at least one element selected from Cr, Nb, Mo, Ta, W, and Ti. This underlayer is desirable because it permits the axis of easy magnetization to assume in-plane orientation in the magnetic layer. The results of the present inventors' experiments indicate the following. If the Cr alloy underlayer is formed directly on the orientation control layer of fcc structure, lattice matching between them is poor and hence the crystal orientation in the underlayer as well as the magnetic layer is poor, because the two-dimensional lattice of the former has a much larger lattice spacing than that of the latter. This problem was solved by replacing the underlayer with that of double-layer structure which consists of a first layer of Cr (adjacent to the orientation control layer of fcc structure) and a second layer which has a larger lattice constant than Cr.

The magnetic disk in this example is combined with the magnetic head shown in FIG. 6 to form the magnetic storage device as shown in FIG. 7. The magnetic head is that of spin valve type provided with a magnetoresistive sensor which utilizes the spin valve effect. Owing to the above-mentioned construction, the magnetic storage device in this example has a recording density exceeding 3 Gbit/in$^2$. The recording density is three times higher than that of the conventional magnetic storage device. The magnetic storage device keeps more than twice the recording density of the conventional magnetic storage device even when the maximum likelihood decoder in the recording-reproducing signal processing unit is replaced with an existing waveform discriminator.

EXAMPLE 4

This example demonstrates another magnetic disk whose construction and manufacturing process are explained in the following.

As in Example 1 shown in FIG. 3, a glass substrate 30 (65 mm in outside diameter) was covered with an orientation control layer 31 (and 31') of Ni-50 at. % Al-2 at. % B (100 nm thick) by DC magnetron sputtering under the condition that the substrate temperature is 270° C., the Ar gas pressure is 2.0 mTorr, and the input power density is 0.7 W/cm$^2$. On the orientation control layer were sequentially formed a first underlayer 32 (and 32') of Cr (20 nm thick), a second underlayer 33 (and 33') of Cr-30 at. % Mo (20 nm thick), a magnetic layer 34 (and 34') of Co-20 at. % Cr-12 at. % Pt-1.5 at. % Ti (20 nm thick), and a protective layer 35 (and 35') of C (5 nm thick) under the same condition as mentioned above. The number preceding each element represents the content of the relevant element.

In Comparative Example 4, a magnetic disk was prepared in the same way as in Example 4 except that the orientation control layer 31 (and 31') of Ni-50 at. % Al-2 at. % B was replaced by that of Ni-50 at. % Al. The orientation control layer in Example 4 contains B whereas that in Comparative Example 4 does not.

FIG. 16 shows the in-plane magnetic properties and media noise in Example 4 and Comparative Example 4. The value of media noise is that which was measured for signals recorded at 250 kFCI. The value in Example 4 is unity and the value in Comparative Example 4 is relative to unity. It is noted that the magnetic disk in to Example 4 is higher in coercive force ($H_c$) and lower in media noise than that in Comparative Example 4. It is also noted that the magnetic disk in Example 4 is higher in coercivity squareness (S*) than that in Comparative Example 4. This suggests a better resolution.

The CoCrPt magnetic layer was tested for diffraction intensity at the (10.0) plane by X-ray diffraction. The results are shown in FIG. 17. The value in Example 4 is unity and the value in Comparative Example 4 is relative to unity. The larger the value, the more the axis of easy magnetization orients in the plane of the magnetic layer. It is understood that the diffraction intensity is higher and there are more magnetic particles whose axis of easy magnetization orients in the plane in Example 4 than in Comparative Example 4.

The CoCrPt magnetic layer of the magnetic disk in both Example 4 and Comparative Example 4 does not give diffraction due to the (11.0) plane. This suggests that the crystal grains in the magnetic layer has the uni-crystalline-structure.

Figure 18:
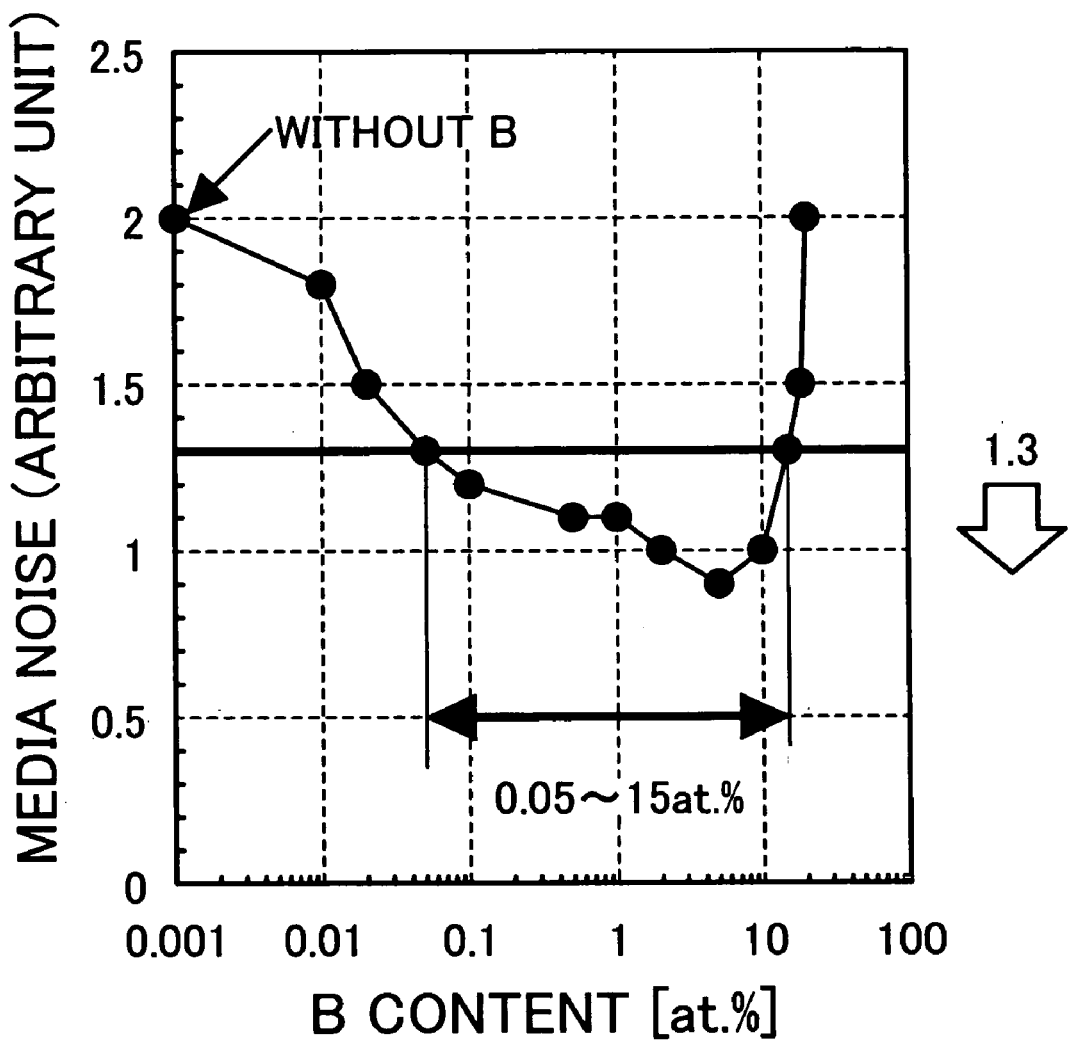
FIG. 18 is a diagram showing how media noise varies depending on the B content in the magnetic recording medium according to the resent invention.

Experiments with the orientation control layer incorporated with B in varied content gave the result shown in FIG. 18. The abscissa represents the content of B added and the ordinate represents the media noise in terms of relative values, with the value for 2 at. % B being unity. The content at 0.001 at. % on the abscissa represents a null content, because the logarithmic scale does not have zero. For the magnetic recording medium to have a recording density exceeding 3 Gbit/in$^2$, it is necessary to reduce the media noise below 1.3. This requirement is met when the content of B is in the range of 0.05 to 15 at. %.

The same result as above is obtained when the material for the orientation control layers 31 and 31' is replaced by any of the following alloys and incorporated with B in an amount of 2 at. %. Al-50 at. % Co, Al-50 at. % Fe, Al-50 at. % Pd, Co-50 at. % Ga, Co-50 at. % Fe, Co-50 at. % Ti, Cu-50 at. % Pd, Cu-50 at. % Zn, Ga-50 at. % Ni, Ga-50 at. % Rh, Ru-50 at. % Si.

In this example, a mention was made of the magnetic disk in which the Cr underlayer or Cr alloy underlayer is interposed between the magnetic layer and the orientation control layer of B2 structure. However, the construction of the magnetic disk may be modified such that the magnetic layer is formed directly on the orientation control layer of B2 structure. This poses no problem in view of the fact that the two-dimensional lattice of the magnetic layer and the two-dimensional lattice of the orientation control layer of B2 structure have almost the same lattice spacing. However, in the case where the Cr underlayer or Cr alloy underlayer is not formed, the axis of easy magnetization has a slightly weak tendency toward in-plane orientation in the magnetic layer. This leads to a decrease in coercive force and an increase in noise level.

For the magnetic recording medium to have a high coercive force and a low noise level, it is common practice to incorporate the magnetic layer with such an element as Pt, Ta, Ti, and Nb. Incorporation with such an element causes the magnetic layer of hcp structure to have a larger lattice constant and the two-dimension lattice formed by the (10.0) plane of the magnetic layer has a larger lattice spacing. The result is poor lattice matching between the magnetic layer and the orientation control layer of B2 structure and poor lattice matching between the magnetic layer and the Cr underlayer. Therefore, the underlayer should be made of an alloy having a large lattice constant. Such an alloy is exemplified by those of Cr—Ti (5–50 at. %), Cr—Mo (5–100 at. %), and Cr—Mo—Ti. The underlayer made of any of these alloys improves the in-plane orientation of the axis of easy orientation of the magnetic layer. It is important that the underlayer have the bcc crystal structure. The Cr—Mo alloy used for the alloy underlayer is a homogeneous solid solution as indicated by its phase diagram for bulk metal and hence it has always the bcc crystal structure. This property makes it easy to produce crystals having any desired lattice spacing. The Cr—Ti alloy gives an underlayer consisting of fine crystal grains and hence the magnetic layer formed thereon also consists of fine crystal grains. This is desirable for noise reduction. However, the Cr—Ti alloy for the underlayer should contain a limited amount of Ti not exceeding 50 at. % because Ti has the hcp crystal structure. The underlayer made of Cr—Mo—Ti alloy has the property derived from respective properties of Cr—Mo alloy and Cr—Ti alloy in proportion to the content of each element. The alloy for the underlayer may contain any of Nb, Ta, and W in place of Cr, Mo, and Ti (although the resulting alloy is slightly inferior to the alloy containing Cr, Mo, and Ti). Other elements than mentioned above should not be used because they disturb crystal orientation and give rise to large crystal grains, which leads to a decrease in coercive force and an increase in noise.

According to a preferred embodiment, the underlayer is of double-layer structure, with the first layer containing Cr and the second layer which is formed on the first underlayer containing at least one element selected from Cr, Nb, Mo, Ta, W, and Ti. This underlayer is desirable because it permits the axis of easy magnetization to assume in-plane orientation in the magnetic layer. The results of the present inventors' experiments indicate the following. If the Cr alloy underlayer is formed directly on the orientation control layer of B2 structure, lattice matching between them is poor and hence the crystal orientation in the underlayer as well as the magnetic layer is poor, because the two-dimensional lattice of the former has a much larger lattice spacing than that of the latter. This problem was solved by replacing the underlayer with that of double-layer structure which consists of a first layer of Cr (adjacent to the orientation control layer of B2 structure) and a second layer which has a larger lattice constant than Cr.

The magnetic disk in this example is combined with the magnetic head shown in FIG. 6 to form the magnetic storage device as shown in FIG. 7. The magnetic head is that of spin valve type provided with a magnetoresistive sensor which utilizes the spin valve effect. Owing to the above-mentioned construction, the magnetic storage device in this example has a recording density exceeding 3 Gbit/in$^2$. The recording density is three times higher than that of the conventional magnetic storage device. The magnetic storage device keeps more than twice the recording density of the conventional magnetic storage device even when the maximum likelihood decoder in the recording-reproducing signal processing unit is replaced with an existing waveform discriminator.

The present invention materializes a magnetic recording medium which has a high coercive force and a low noise level and is only slightly vulnerable to thermal fluctuation.

This magnetic recording medium is combined with a magnetic head having a reproducing element that utilizes the magnetoresistive effect, so as to provide a magnetic storage device which has a recording density in excess of 3 Gbit/in².

The invention claimed is:

1. A magnetic recording medium which comprises a substrate, an orientation control layer formed thereon, a Co alloy magnetic layer formed above the orientation control layer, and a Cr underlayer or Cr alloy underlayer formed between the orientation control layer and the Co alloy magnetic layer, said orientation control layer containing at least Ti in an amount not less than 35 at. % and not more than 65 at. % and Al in an amount not less than 35 at. % and not more than 65 at. %.

2. A magnetic recording medium as defined in claim 1, wherein the orientation control layer substantially has an L10 (AuCu I) crystal structure.

3. A magnetic recording medium as defined in claim 1, wherein the underlayer is that of double-layer structure which consists of a first underlayer made of Cr and a second underlayer which is formed on the first underlayer containing at least one species of element selected from Cr, Nb, Mo, Ta, W, and Ti.

4. A magnetic recording medium as defined in claim 1, which has an intermediate layer between the magnetic layer and the underlayer, said intermediate layer being made of a material containing Co and not less than 25 at. % Cr.

5. A magnetic recording medium which comprises a substrate, an orientation control layer formed thereon, and a Co alloy magnetic layer formed thereon with a Cr underlayer or Cr alloy underlayer interposed between them, said orientation control layer containing at least one element selected from group A (consisting of Ni and Co) in an amount of from 30 at. % to 60 at. %, Al in an amount from 20 at. % to 30 at. %, and one element selected from group B (consisting of Ti and Zr) in an amount from 20 at. % to 30 at. %.

6. A magnetic recording medium as defined in claim 5, wherein the orientation control layer substantially has an L21 (Cu2AlMn type) crystal structure.

7. A magnetic recording medium as defined in claim 5, wherein the underlayer is that of double-layer structure which consists of a first underlayer made of Cr and a second under-layer which is formed on the first underlayer containing at least one species of element selected from Cr, Nb, Mo, Ta, W, and Ti.

8. A magnetic recording medium as defined in claim 5, which has an intermediate layer between the magnetic layer and the underlayer, said intermediate layer being made of a material containing Co and not less than 25 at. % Cr.

9. A magnetic recording medium which comprises a substrate, an orientation control layer formed thereon, and a Co alloy magnetic layer formed thereon with an underlayer interposed between them, said orientation control layer having the B2 (CsCl) crystal structure incorporated with at least B,
wherein the underlayer is that of double-layer structure which consists of a first underlayer made of Cr and a second underlayer which is formed on the first underlayer containing at least one species of element selected from Cr, Nb, Mo, Ta, W, and Ti.

10. A magnetic recording medium which comprises a substrate, an orientation control layer formed thereon, and a Co alloy magnetic layer formed thereon with a Cr underlayer or Cr alloy underlayer interposed between them, said orientation control layer having the B2 (CsCl) crystal structure incorporated with at least B, and an intermediate layer between the magnetic layer and the underlayer, said intermediate layer being made of a material containing Co and not less than 25 at. % Cr.

11. A magnetic storage device having a magnetic recording medium, a driver to turn said magnetic recording medium in the recording direction, a magnetic head including a recording element and a read-back element, means to move said magnetic head relative to said magnetic recording medium, and a record-read signal processing means to perform waveform processing on input signals to and output signals from said magnetic head, wherein said magnetic recording medium is the magnetic recording medium defined in claim 1 and the read-back element of said magnetic head is a magnetoresistive effect element.

* * * * *